US007975508B2

(12) United States Patent
Akai et al.

(10) Patent No.: US 7,975,508 B2
(45) Date of Patent: Jul. 12, 2011

(54) METHOD FOR PRODUCING HIGH SILICATE GLASS AND HIGH SILICATE GLASS

(75) Inventors: Tomoko Akai, Midorigaoka Ikeda (JP); Danping Chen, Midorigaoka Ikeda (JP)

(73) Assignee: Japan Science and Technology Agency, Saitama (JP)

( * ) Notice: Subject to any disclaimer, the term of this patent is extended or adjusted under 35 U.S.C. 154(b) by 1354 days.

(21) Appl. No.: 10/549,609

(22) PCT Filed: Mar. 19, 2004

(86) PCT No.: PCT/JP2004/003810
§ 371 (c)(1),
(2), (4) Date: Sep. 20, 2005

(87) PCT Pub. No.: WO2004/083145
PCT Pub. Date: Sep. 30, 2004

(65) Prior Publication Data
US 2006/0201200 A1    Sep. 14, 2006

(30) Foreign Application Priority Data

Mar. 20, 2003 (JP) ................................. 2003-078846

(51) Int. Cl.
*C03C 15/00* (2006.01)
(52) U.S. Cl. .................. 65/30.1; 65/31; 65/23; 65/33.1; 65/21.1; 65/21.4
(58) Field of Classification Search .................... 65/30.1, 65/31, 23, 33.1, 21.1, 21.4
See application file for complete search history.

(56) References Cited

U.S. PATENT DOCUMENTS

| 2,106,744 | A | * | 2/1938 | Nordberg et al. | 502/439 |
| 2,106,774 | A | | 2/1938 | Tarbox | |
| 3,113,855 | A | | 12/1963 | Elmer | |
| 4,039,339 | A | * | 8/1977 | Elmer et al. | 501/54 |
| 4,294,811 | A | * | 10/1981 | Aulich et al. | 423/350 |
| 2002/0018942 | A1 | | 2/2002 | Brown et al. | |

FOREIGN PATENT DOCUMENTS

EP    0 601 391 A1    6/1994
(Continued)

OTHER PUBLICATIONS

JP 57188432 A (English Translation).*
(Continued)

*Primary Examiner* — Khanh Nguyen
*Assistant Examiner* — Margaret Squalls
(74) *Attorney, Agent, or Firm* — Harness, Dickey & Pierce, P.L.C.

(57) ABSTRACT

The present invention provides: a method for producing high silicate glass which has a low Fe concentration and can achieve a high UV transmittance while retaining advantages of Vycor glass that mass-production at low cost is feasible and that complex formation with various photofunctional ions can be effected; and high silicate glass of a high UV transmittance. For obtaining the above high silicate glass, the method is characterized by comprising the steps of: heating borosilicate glass including a heavy metal or rare-earth element (preferably a high-valence heavy metal or rare-earth element) so as to phase-separate the borosilicate glass; subjecting the phase-separated borosilicate glass to acid treatment so as to elute a metal; and sintering the acid-treated borosilicate glass.

3 Claims, 4 Drawing Sheets

FOREIGN PATENT DOCUMENTS

| | | |
|---|---|---|
| JP | 56-088819 | 7/1981 |
| JP | 57-188432 A | 11/1982 |
| JP | 57-205337 | 12/1982 |
| JP | 57-205337 A | 12/1982 |
| JP | 59-102832 A | 6/1984 |
| JP | 06-199538 A | 7/1994 |
| JP | 2003-313050 A | 11/2003 |

OTHER PUBLICATIONS

JP 59102832 A (English Translation).*
JP 57-205337 A (English Translation).*
T. Akai et al., "A New Method for Waste Glass Recycling", Journal of Ecotechnology Research, 8[2], pp. 152-153 (2002).
Database WPI Derwent Publications Ltd., London, GB; AN 1983-10492K (Document No. XP002475842).
C.R. Bamford, "Colour Generation and Control in Glass," Chapter 4: Reduction-Oxidation Equilibria, 1997, pp. 77-87 (Document No. XP-002474810).
F.V. Tooley, "The Handbook of Glass Manufacture," Handbook of Glass Manufacture, Book of Reference for the Plant Executive, Technologist and Engineer, vol. 2, 1984, pp. 746-747 (Document No. XP-002474811).
D. Ehrt et al., "Einbau and Verteilung Von FE203 Auf Die Mikrophasen in Grundglaesern des Systems NA2-B203-SI02", Silikattechenik, Veb Verlag Fuer Bauwesen, Berlin, Germany, vol. 27, No. 9, Sep. 1976 (Document No. XP-001220074).
Lange, "Rohstoffe der Glasindustrie," 1993, Deutscher Verlag Für Grundstoffindustrie, Leipzig; Stuttgart, p. 182, table 2.84 (Document No. XP-002476658).
European Search Report dated May 26, 2008 for counterpart European Application No. 04 72 2078.5.
Internatinoal Search Report & International Preliminary Examiation Report.
Japanese Office Action mailed Jun. 23, 2009 in corresponding Japanese Application No. 2005-503771, with English translation.

* cited by examiner

US 7,975,508 B2

METHOD FOR PRODUCING HIGH SILICATE GLASS AND HIGH SILICATE GLASS

PRIORITY STATEMENT

This application is a National Phase entry of PCT Application No. PCT/JP2004/003810, filed on Mar. 19, 2004, which claims priority to Japanese Application No. 2003-078846, filed on Mar. 20, 2003, in the Japanese Patent Office.

TECHNICAL FIELD

The present invention relates to a method for producing high silicate glass which has a high ultraviolet (UV) transmittance and which can be used as an excimer laser base material, a UV transmission filter, a UV utilization material, and the like. The present invention also relates to high silicate glass which has a high UV transmittance.

BACKGROUND ART

Conventionally, quartz glass has been widely used as a UV transmission material. Quartz glass is produced by using a CVD (chemical vapor deposition) process, a melting process, or other processes. However, these production processes have drawbacks such as extremely high cost and difficulty of upsizing. Particularly, the melting process has the drawback of requiring a very high temperature (1900° C. or above). In recent years, a technique for producing a light source such as a UV region laser or a lamp has been established, and quartz glass has been used for various purposes other than infrared optical communications-use fiber, so that there has been an increasing demand for quartz glass in various ways. Therefore, there is a high demand for a method for producing quartz glass at lower cost.

Further, Patent Document 1 (U.S. Pat. No. 2,106,774) discloses, as a method for mass-producing high silicate glass consisting mainly of silicic acid, a method including the steps of: separating alkaline borosilicate glass into an insoluble phase rich in $SiO_2$ and a soluble phase rich in $B_2O_3$ by subjecting the alkaline borosilicate glass to heat treatment; producing porous glass consisting mainly of $SiO_2$, by eluting the soluble phase with acid; and sintering the porous glass. This method is called a Vycor method.

However, the Vycor method causes Fe (iron) ions and water to remain in glass and thus has the problem that UV and IR transmittances cannot be sufficiently increased. For this reason, the Vycor method is not used as a method for producing quartz glass.

As described above, because Vycor glass (glass produced by the conventional Vycor method) contains a very small quantity of Fe ions highly absorptive of short-wavelength UV rays, the Vycor glass is known to have a lower UV transmittance than quartz glass (see Patent Document 2 (Japanese Unexamined Patent Publication No. 205337/1982 (Tokukaisho 57-205337; published on Dec. 16, 1982))). In view of this, in order to increase a UV transmittance of high silicate glass, Patent Document 2 discloses a method for producing high silicate glass, the method including the steps of: subjecting porous glass to further acid treatment with acid containing ethylenediamine tetraacetic acid (EDTA) or a salt thereof; eluting as a water-soluble complex salt a very small quantity of Fe ions contained in the porous glass; and sintering the porous glass.

However, glass produced by the method of Patent Document 2 has an absorption end of approximately 220 nm, and has a much lower UV transmittance than quartz glass, which has an absorption end of 160 nm. Therefore, it cannot be said that the method of Patent Document 2 has the effect of sufficiently removing Fe ions.

The present invention has been made in view of the foregoing problems and has as an object to provide: a method for producing high silicate glass which has a low Fe concentration and can achieve a high UV transmittance while retaining advantages of Vycor glass that mass production at low cost is feasible and that complex formation with various photofunctional ions can be effected; and high silicate glass obtained by the method.

DISCLOSURE OF INVENTION

The inventors of the present application recognized that in alkaline borosilicate glass including imitation green glass and boric acid added thereto, the distribution of transition metal becomes uneven, and this causes metal ions to be concentrated in a borate phase, so that the metal ions leach by acid (see Non-patent Document 1 (T. Akai, D. Chen, H. Masui, H. Mitsuyoshi, and T. Yazawa, "A new way of recycling waste glass", *Journal of Ecotechnology Research*, p. 152-153; issued by International Association of Ecotechnology Research; published on Dec. 5, 2002)). Further, the inventor supposed that heat treatment of the borosilicate glass causes low-valence Fe ions contained in the borosilicate glass to transform into high-valence $Fe^{3+}$ ions so that the high-valence $Fe^{3+}$ ions can be dispersed in the borate phase, and that the high-valence $Fe^{3+}$ ions can be removed by further subjecting the borosilicate glass to acid treatment. Furthermore, the inventors found that $Fe^{2+}$ ions contained in glass produced by using, as a raw material, borosilicate glass which contains a heavy metal or rare-earth element (preferably a high-valence heavy metal or rare-earth element) can be transformed into $Fe^{3+}$ ions during melting. Based on this finding, the inventors have completed the present invention.

That is, a method of the present invention for producing high silicate glass is characterized by including: a phase-separating step of subjecting to heat treatment borosilicate glass containing a heavy metal or rare-earth element, so as to phase-separate the borosilicate glass; an acid-treatment step of subjecting the phase-separated borosilicate glass to acid treatment so as to elute a metal; and a sintering step of sintering the acid-treated borosilicate glass.

The method for producing high silicate glass is an application of the Vycor method, and heat treatment of borosilicate glass makes it possible to phase-separate the borosilicate glass into an insoluble phase (silicate phase) consisting mainly of $SiO_2$ and a soluble phase (borate phase) consisting mainly of $B_2O_3$. According to the producing method of the present invention, the borosilicate glass contains a heavy metal or rare-earth element so that in the phase-separating step, low-valence Fe ions ($Fe^{2+}$ ions) can be transformed into $Fe^{3+}$ ions.

According to the finding of the inventors, since high-valence metal ions are concentrated in a borate phase, the low-valence Fe ions which are contained in the borosilicate glass and which have been transformed into the $Fe^{3+}$ ions are dispersed in the borate phase. In the method for producing high silicate glass, a metal can be eluted by the acid-treatment step, following the phase-separating step, so that the $Fe^{3+}$ ions can be removed together with other metal ions. Moreover, sintering the borosilicate glass after the acid-treatment step makes it possible to obtain high silicate glass which has a low Fe concentration and a high UV transmittance.

That is, according to the method of the present invention for producing high silicate glass, high silicate glass which has a low Fe concentration and a high UV transmittance can be obtained. Moreover, since the method applies the same method as the conventional Vycor method, high silicate glass which has a high UV transmittance can be mass-produced at low cost.

The "heavy metal or rare-earth element" comes in various forms, such as simple chemical substance, compound, and ions, in which an element normally exists. However, in the method of the present invention for producing silicate glass, the heavy metal or rare-earth element preferably exists in the borosilicate glass in the form of a high-valence heavy metal or rare-earth element capable of serving as an oxidant. This makes it possible to more effectively oxidize low-valence Fe ions ($Fe^{2+}$ ions) contained in borosilicate glass to $Fe^{3+}$ ions.

In the method of the present invention for producing high silicate glass, the borosilicate glass preferably contains any one element of manganese, cerium, chromium, cobalt, and copper.

According to the foregoing producing method, a Fe concentration of high silicate glass to be obtained can be further lowered, so that a UV transmittance can be further increased. Moreover, according to the foregoing producing method, since the same method as the conventional Vycor method is applied, high silicate glass which has a high UV transmittance can be mass-produced at low cost.

Further, in the method of the present invention for producing high silicate glass, the borosilicate glass preferably contains 0.1 wt % to 2.0 wt % of oxide of the element (i.e., any one of manganese (Mn), cerium (Ce), chromium (Cr), cobalt (Co), and copper (Cu)).

According to the foregoing producing method, a Fe concentration of high silicate glass to be obtained can be much further lowered, so that a UV transmittance can be further increased. Moreover, according to the foregoing producing method, since the same method as the conventional Vycor method is applied, high silicate glass which has a high UV transmittance can be mass-produced at low cost.

In the method of the present invention for producing high silicate glass, the oxide containing the element is preferably a high-valence oxide of the element. This makes it possible to more effectively oxidize low-valence Fe ions ($Fe^{2+}$ ions) contained in borosilicate glass to $Fe^{3+}$ ions.

In the method of the present invention for producing high silicate glass, the borosilicate glass is preferably produced by carrying out first and second melting steps of melting a glass consisting of a mixture of compounds serving as raw materials, by heating the glass.

According to the foregoing producing method, high silicate glass which has a higher UV transmittance can be produced as compared with high silicate glass produced without the second melting step.

In the method of the present invention for producing high silicate glass, boric acid to be contained in the borosilicate glass is preferably added in the second melting step.

According to the foregoing producing method, high silicate glass which has a higher UV transmittance can be produced.

Preferably, the method of the present invention for producing high silicate glass is arranged such that when the borosilicate glass contains cerium or chromium, the borosilicate glass is subjected repeatedly to heat treatment and acid treatment between the acid-treatment step and the sintering step and is then subjected to further acid treatment by using acid containing ethylenediamine tetraacetic acid.

According to the foregoing method, because ethylenediamine tetraacetic acid (EDTA) combines with a metal to form a complex salt, a Fe concentration of high silicate glass to be obtained can be further lowered. This makes it possible to obtain high silicate glass which has substantially the same UV transmittance as quartz glass at a wavelength of approximately 185 nm.

Further, high silicate glass of the present invention is characterized by being produced according to any one of the foregoing arrangements of the method for producing high silicate glass.

Because the high silicate glass can be mass-produced at low cost compared with quartz glass which is produced by a melting process, a CVD process, or other processes, the high silicate glass can be upsized. Moreover, the high silicate glass has a higher UV transmittance than Vycor glass (glass produced by the conventional Vycor method) and has substantially the same UV transmittance as quartz glass. Therefore, the high silicate glass allows for formation of a complex compound by introducing UV emission photofunctional ions as dopants into the high silicate glass.

Because the high silicate glass of the present invention contains silica as porous as that contained in the Vycor glass (glass produced by the conventional Vycor method), the high silicate glass has the advantage of being translucent and having a large surface area. The advantage allows the high silicate glass to be used as a photocatalyst carrier and a complex glass base material for a novel photofunctional material. In this case, since the high silicate glass has a higher UV transmittance than the Vycor glass (glass produced by the conventional Vycor method), the high silicate glass can deal with Xe light (176 nm), which is used to shorten a wavelength of an exciter and which is used for a mercury-free lamp. Thus, the high silicate glass has the possibility of being widely used as various optical materials.

Further, in the method of the present invention for producing high silicate glass, pores of the silica may be impregnated with chemical substances such as rare-earth ions before the sintering step, so that the chemical substances are implanted into the pores in the sintering step.

Because the high silicate glass produced according to the foregoing method has substantially the same transmittance as quartz glass in a UV region, the high silicate glass can deal with Xe light (176 nm), which is used to shorten a wavelength of an exciter and which is used for a mercury-free lamp. Thus, the high silicate glass can be effectively used as a complex glass base material for a novel photofunctional material.

Furthermore, high silicate glass of the present invention is characterized by transmitting 30% or more of light at a wavelength of 200 nm when containing 10 ppm or more of boron and having a thickness of 1 mm.

The foregoing high silicate glass has a higher UV transmittance than the Vycor glass (glass produced by the conventional Vycor method). Therefore, the high silicate glass allows for formation of a complex compound by introducing UV emission photofunctional ions as dopants into the high silicate glass. Thus, the high silicate glass has the possibility of being widely used as various optical materials.

The high silicate glass is characterized by transmitting 30% or more of light at a wavelength of 200 nm when supposedly having a thickness of 1 mm. However, the thickness of the high silicate glass is not to be limited to 1 mm.

For a fuller understanding of the nature and advantages of the invention, reference should be made to the ensuing detailed description taken in conjunction with the accompanying drawings.

BEST MODE FOR CARRYING OUT THE INVENTION

Figure 1:
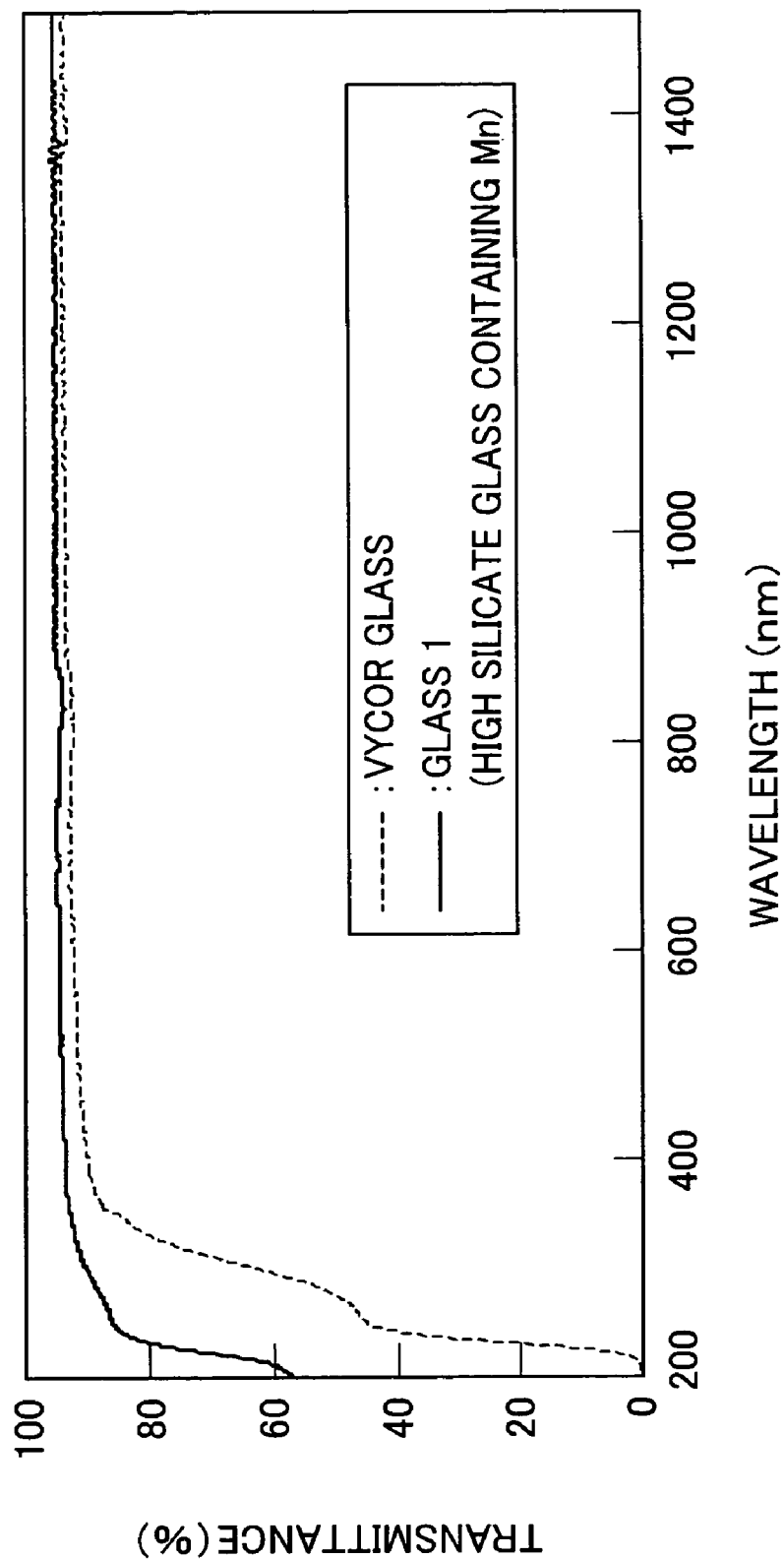
FIG. 1 is a graph showing results of measuring respective transmittances (%) of Glass 1 and Vycor glass with respect to light at each wavelength (nm). Note that Glass 1 is a type of high silicate glass which was produced from a $MnO_2$-containing raw material in Example 1.

One embodiment of a method for producing high silicate glass and high silicate glass of the present invention will be described below. The present invention is not to be limited by this description.

High silicate glass according to the present invention consists mainly of silicon oxide ($SiO_2$), and the feature of its producing method brings the high silicate glass having a lower Fe concentration and a higher UV transmittance than the conventional high silicate glass produced for example by the Vycor method (see Patent Document 1).

In order to produce such high silicate glass, a producing method of the present invention includes: a phase-separating step of subjecting to heat treatment borosilicate glass containing a heavy metal or rare-earth element, so as to phase-separate the borosilicate glass; an acid-treatment step of subjecting the phase-separated borosilicate glass to acid treatment so as to elute a metal; and a sintering step of sintering the acid-treated borosilicate glass.

In the present embodiment, such a case will be described that borosilicate glass whose glass composition contains 0.1 wt % to 2.0 wt % of oxide of any one element of manganese (Mn), cerium (Ce), chromium (Cr), cobalt (Co), and copper (Cu) is used as a raw material for high silicate glass in the foregoing method. The glass composition of the borosilicate glass serving as the raw material for the high silicate glass is not particularly limited, except for the foregoing condition. It is only necessary to copy the composition of normal borosilicate glass by using a compound used as a raw material for the normal borosilicate glass.

More specifically, the borosilicate glass only needs to appropriately contain compounds containing elements such as Si, 0, B, Na, Al, and Ca, in addition to Mn, Ce, Cr, Co, or Cu, and include approximately 45 wt % to 60 wt % of $SiO_2$ and approximately 24 wt % to 36 wt % of $B_2O_3$. Preferably, Mn, Ce, Cr, Co, and Cu are included in the form of high-valence oxides such as $MnO_2$, $CeO_2$, $Cr_2O_3$, $Co_2O_3$, and CuO. A high-valence oxide of the element (any one of Mn, Ce, Cr, Co, and Cu) serves as an oxidant so as to cause iron contained in the borosilicate glass to be effectively transformed into $Fe^{3+}$ ions.

The borosilicate glass can be produced in the following manner. First, the foregoing compounds are mixed in an appropriate proportion. Next, the mixture is melted for several hours at a temperature of 1350° C. and 1450° C. for example. Thereafter, the mixture is cooled down, thereby producing the borosilicate glass.

The borosilicate glass thus produced is subjected to heat treatment so as to be separated into an insoluble phase (silicate phase) consisting mainly of $SiO_2$ and a soluble phase (borate phase) consisting mainly of $B_2O_3$. The heat treatment is carried out for approximately 20 to 80 hours at a temperature of approximately 550° C. to 650° C. In the present embodiment, this step is called a phase-separating step.

The borosilicate glass contains 0.1 wt % to 2.0 wt % of oxide (preferably a high-valence oxide) of any one of Mn, Ce, Cr, Co, and Cu, so that Fe ions contained in the borosilicate glass is transformed into $Fe^{3+}$ ions and the $Fe^{3+}$ can be dispersed in the borate phase in the phase-separating step.

In the method according to the present invention for producing high silicate glass, after the phase-separating step, an acid-treatment step is carried out. In the acid-treatment step, the phase-separated borosilicate glass is subjected to acid treatment so as to elute metal ions contained therein. This makes it possible to remove the iron ions dispersed in the borate phase, together with boron ions, sodium ions, calcium ions, and other ions, so that the borosilicate glass becomes porous glass with a low Fe content.

Thereafter, a sintering step of sintering the borosilicate glass (porous glass) is carried out, thereby producing high silicate glass which has a high UV transmittance. Preferably, the sintering step is carried out at a temperature of approximately 1050° C. to 1200° C. Further, the sintering step may be carried out in the air or in the reduction atmosphere.

The method of the present invention for producing high silicate glass is based on the Vycor method in that heat-treated borosilicate glass is subjected to acid treatment so as to elute a soluble phase and is further sintered. That is, the method according to the present invention for producing high silicate glass can be carried out in the same manner as the conventional Vycor method (see Patent Document 1) except that the borosilicate glass serving as a raw material contains 0.1 wt % to 2.0 wt % of oxide (preferably a high-valence oxide) of any one of Mn, Ce, Cr, Co, and Cu. Therefore, it can be said that the method of the present invention for producing high silicate glass is a method to which the Vycor method is applied.

The method of the present invention for producing high silicate glass produces high silicate glass which has a lower Fe concentration than that produced by the Vycor method. This makes it possible, as described in Example 1 later, to obtain high silicate glass capable of transmitting approximately 60% of UV rays at a wavelength of approximately 200 nm (see FIG. 1). Moreover, since the same method as the conventional Vycor method is applied, high silicate glass can be mass-produced at low cost.

The borosilicate glass is produced by carrying out a melting step of melting a raw material at a high temperature, the raw material being obtained by mixing in an appropriate proportion a plurality of compounds containing Si, O, B, Na, Al, other elements, and an oxide of any one of Mn, Ce, Cr, Co and Cu (preferably a high-valence oxide). The melting step is preferably carried out twice, and boric acid ($H_3BO_3$) to be contained in the borosilicate glass is preferably added in a second melting step of first and second melting steps. According to these arrangements, as described in Examples later, a UV transmittance of high silicate glass to be obtained can be further heightened.

Further, in the method of the present invention for producing high silicate glass, as described above, the sintering step may be carried out immediately after the acid-treatment step.

Alternatively, heat treatment and acid treatment may be carried out repeatedly between the acid-treatment step and the sintering step.

Furthermore, in the method of the present invention for producing high silicate glass, when the borosilicate glass contains cerium (Ce) or chromium (Cr), it is preferable that the borosilicate glass be subjected repeatedly to heat treatment and acid treatment multiple times between the acid-treatment step and the sintering step and then be subjected to further acid treatment with acid containing ethylenediamine tetraacetic acid (EDTA).

According to this arrangement, because EDTA combines with a metal contained in the borosilicate glass so as form a complex salt, a Fe concentration of high silicate glass to be produced is further lowered. This makes it possible to obtain high silicate glass having substantially the same UV transmittance as quartz glass at a wavelength of approximately 185 nm.

Further, high silicate glass of the present invention is produced according to the foregoing method for producing high silicate glass. That is, the high silicate glass of the present invention is produced by sintering a raw material after the phase-separating step and the acid-treatment step, the raw material being borosilicate glass which contains a heavy metal or rare-earth element. More specifically, the high silicate glass of the present invention is produced by using, as a raw material, borosilicate glass which contains 0.1 wt % to 2.0 wt % of oxide of any one of manganese, cerium, chromium, cobalt, and copper.

Since the high silicate glass is produced according to the producing method as described above, a very small quantity of Fe contained in the borosilicate glass is eluted by the acid-treatment step, thereby achieving a low Fe concentration. Thus, the high silicate glass can exhibit a high UV transmittance.

Therefore, the high silicate glass of the present invention has an advantage of being able to be excited by light at a shorter wavelength. For this reason, the high silicate glass allows for formation of a complex compound for example by introducing UV emission photofunctional ions as dopants into the high silicate glass. Thus, the high silicate glass of the present invention can be applied to the development of optical materials such as fluorescent materials.

Further, the high silicate glass produced from the borosilicate glass containing cerium or chromium can have substantially the same UV transmittance as quartz glass at a wavelength of approximately 185 nm, when the borosilicate glass is subjected to acid treatment with acid containing EDTA before the sintering step. The high silicate glass can be mass-produced at lower cost than quartz glass while retaining substantially the same UV transmittance as quartz glass.

Furthermore, the high silicate glass of the present invention can be shaped into various forms such as tubes, plates, and fibers by appropriately changing producing conditions. This extends the range of applications of the present invention. Specifically, the high silicate glass can be shaped into various forms for example by a method including the steps of: melting the borosilicate glass; placing the melted borosilicate glass in molds of various shapes; and cooling the melted borosilicate glass.

In the high silicate glass producing method described in the present embodiment, an example of the borosilicate glass that is a raw material of the high silicate glass is the borosilicate glass which contains 0.1 wt % to 2.0 wt % of oxide of any one of Mn, Ce, Cr, Co, and Cu. However, the borosilicate glass may contain another heavy metal or rare-earth element.

The present invention will be described more in detail by way of Examples in conjunction with the accompanying drawings. However, the present invention is not to be limited to the following Examples, and details thereof can be varied in many ways.

EXAMPLES

Example 1

In Example 1, glass was obtained in the following manner. Commercially available reagents ($Na_2CO_3$, $H_3BO_3$, $SiO_2$, $Al(OH)_3$, $CaCO_3$, and $MnO_2$) were weighed and mixed so as to achieve a glass composition having $Na_2O$: 7.7 (wt %), CaO: 4.0 (wt %), $Al_2O_3$: 2.7 (wt %), $MnO_2$: 0.7 (wt %), $B_2O_3$: 33.3 (wt %), and $SiO_2$: 51.7 (wt %). The mixture was melted for four hours at 1400° C. by using a platinum crucible.

The thus obtained glass was polished, was heated for 40 hours at 590° C. in a heat-treating furnace, and was subjected to phase separation. Thereafter, the phase-separated glass was contained together with 1N nitric acid into an airtight container and was subjected to acid treatment for 24 to 72 hours at 90° C. The acid-treated glass was further sintered for two hours at 1100° C. in the air, thereby producing high silicate glass (hereinafter referred to as "Glass 1"). Measurement was conducted on a transmittance of Glass 1 with a thickness of 1.0 mm.

As a comparative example of Example 1, high silicate glass was produced by the conventional Vycor method. Specifically, according to the conventional method, high silicate glass is produced in the same procedures as those of the foregoing method by using commercially available Vycor glass (manufactured by Iwaki Glass Co., Ltd) (High silicate glass produced by the conventional Vycor method is hereinafter referred to as "Vycor glass".). Measurement was conducted on a transmittance of the Vycor glass with a thickness of 1.0 mm.

The measurement results are shown in FIG. 1. FIG. 1 is a graph showing results of measuring respective transmittances (%) of the two types of high silicate glass with respect to light at each wavelength (nm). In FIG. 1, the solid line indicates a transmission spectrum of Glass 1, and the dotted line indicates a transmission spectrum of the Vycor glass.

As shown in FIG. 1, Glass 1 transmitted approximately 60% of UV rays having a wavelength of 200 nm. Meanwhile, the Vycor glass transmitted no UV rays at a wavelength of 200 nm or below.

Example 2

In Example 2, glass was obtained in the following manner. Commercially available reagents ($Na_2CO_3$, $H_3BO_3$, $SiO_2$, $Al(OH)_3$, and $CaCO_3$) were weighed and mixed so as to achieve a glass composition of $SiO_2$: 77.5 (wt %), $Na_2O$: 11.5 (wt %), CaO: 6.0 (wt %), and $Al_2O_3$: 5.0 (wt %). In a first melting step, the mixture was melted for four hours at 1500° C. by using a platinum crucible. Thereafter, in a second melting step, $H_3BO_3$ was added to the mixture so as to achieve a glass composition having 50 parts by weight of $H_3BO_3$ per 100 parts by weight of the glass obtained after melting. Then, the mixture was subjected to second melting at 1400° C.

The thus obtained glass was polished, was heated for 40 hours at 590° C. in a heat-treating furnace, and was subjected to phase-separation. The phase-separated glass was contained together with 1N nitric acid into an airtight container and was subjected to acid treatment for 24 to 72 hours at 90° C. The acid-treated glass was further sintered for two hours at 1100°

C. in the reduction atmosphere, thereby producing high silicate glass (hereinafter referred to as "Glass 2") with a thickness of 1.0 mm. Measurement was conducted on a transmittance of Glass 2.

As a comparative example of Example 2, high silicate glass was produced in the following manner. In a first melting step, $H_3BO_3$ was added in the same proportion as in Example 2, thereby producing high silicate glass (hereinafter referred to as "Glass 3") without a second melting step. Measurement was conducted on a transmittance of Glass 3 with a thickness of 1.0 mm. Glass 3 of the present comparative example was produced by the same method as Glass 2 of Example 2 except that the melting step was carried out once.

Figure 2:
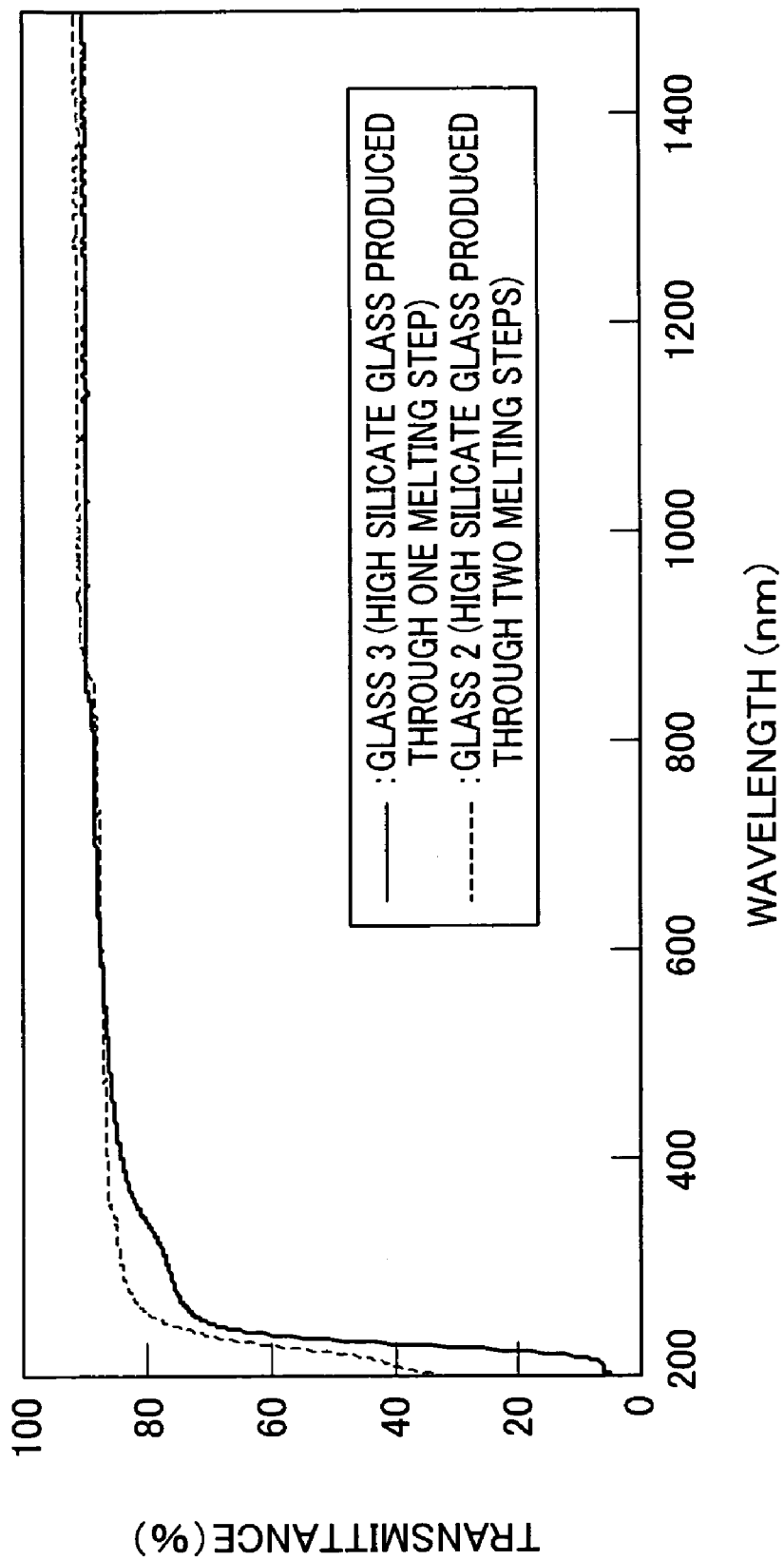
FIG. 2 is a graph showing results of measuring respective transmittances (%) of Glass 2 and Glass 3 with respect to light at each wavelength (nm). Note that Glass 2 is a type of high silicate glass which was produced by carrying out first and second melting steps, and Glass 3 is high silicate glass which was produced by carrying out without the second melting step.

The measurements results are shown in FIG. 2. FIG. 2 is a graph showing results of measuring respective transmittances (%) of the two types of high silicate glass with respect to light at each wavelength (nm). In FIG. 2, the solid line indicates a transmittance spectrum of Glass 3, and the dotted line indicates a transmission spectrum of Glass 2.

As shown in FIG. 2, it was confirmed that Glass 2 had a higher transmittance with respect to UV rays having a wavelength of approximately 200 nm than Glass 3.

Example 3

In Example 3, glass was obtained in the following manner. Commercially available reagents ($Na_2CO_3$, $H_3BO_3$, $SiO_2$, $Al(OH)_3$, $CaCO_3$, and $CeO_2$) were weighed and mixed so as to achieve a glass composition of $SiO_2$: 77.5 (wt %), $Na_2O$: 11.5 (wt %), CaO: 6.0 (wt %), $Al_2O_3$: 4.0 (wt %), and $CeO_2$: 1.0 (wt %). In a first melting step, the mixture was melted for four hours at 1500° C. by using a platinum crucible. In a second melting step, $H_3BO_3$ was added to the mixture so as to achieve a glass composition having parts by weight of $H_3BO_3$ per 100 parts by weight of the glass obtained after melting. Then, the mixture was subjected to second melting at 1400° C.

The thus obtained glass was polished, was heated for 40 hours at 590° C. in a heat-treating furnace, and was subjected to phase-separation. The phase-separated glass was contained together with 1N nitric acid into an airtight container and was subjected to acid treatment for 24 to 72 hours at 90° C., thereby obtaining porous glass.

The porous glass thus obtained by the acid treatment was further heated for 15 hours at 300° C. Thereafter, the porous glass was contained together with 3N nitric acid into an airtight container and was subjected to acid treatment for 24 hours at 90° C. The acid-treated glass was further sintered for two hours at 1100° C. in the air, thereby producing high silicate glass (hereinafter referred to as "Glass 4"). Alternatively, the acid-treated glass was further sintered for two hours at 1100° C. in the reduction atmosphere, thereby producing high silicate glass (hereinafter referred to as "Glass 5"). Thereafter, measurement was conducted on respective transmittances of Glass 4 and Glass 5 with a thickness of 1.0 mm.

In Example 3, another method was used to produce high silicate glass from the porous glass which had been subjected to acid treatment for 24 to 72 hours at 90° C. The method will be described below.

The porous glass which had been subjected to acid treatment for 24 to 72 hours at 90° C. was heated for 15 hours at 300° C. Thereafter, the porous glass was contained together with 3N nitric acid into an airtight container and was subjected to acid treatment for 24 hours at 90° C. The acid-treated porous glass was further heated for 15 hours at 300° C. Thereafter, the porous glass was subjected to acid treatment for 24 hours at 90° C. by using acid containing 1% of ethylenediamine tetraacetic acid (EDTA).

Thereafter, the resulting sample was sintered for two hours at 1100° C. in the reduction atmosphere, thereby producing high silicate glass (hereinafter referred to as "Glass 6"). Measurement was conducted on a transmittance of Glass 6 with a thickness of 1.0 mm.

Figure 3:
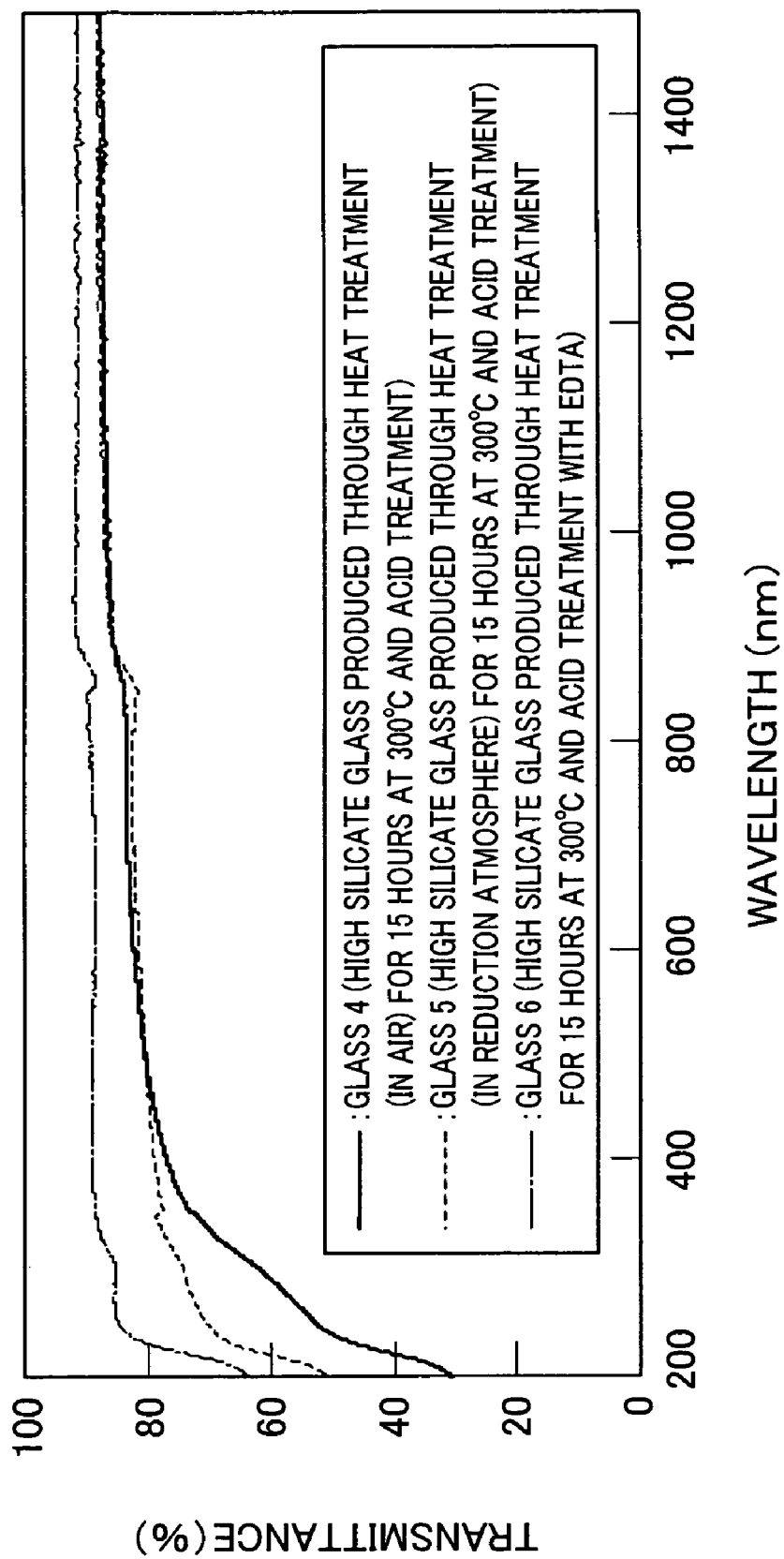
FIG. 3 is a graph showing results of measuring transmittances (%) of types of high silicate glass produced in Example 3 with respect to light at each wavelength (nm).

The measurement results are shown in FIG. 3. FIG. 3 is a graph showing results of measuring respective transmittances of the three types of high silicate glass with respect to light at each wavelength (nm). In FIG. 3, the solid line indicates a transmission spectrum of Glass 4. The dotted line indicates a transmission spectrum of Glass 5. The dashed line indicates a transmission spectrum of Glass 6.

As shown in FIG. 3, it was confirmed that Glass 5 (indicated by the dotted line) exhibited a higher UV transmittance than Glass 4 (indicated by the solid line). Further, it was confirmed that Glass 6 (indicated by the dashed line) exhibited a much higher UV transmittance. However, from a comparison between Examples 2 and 3, it is apparent that as to the types of high silicate glass produced without using EDTA (Glass 2, Glass 3, Glass 4, and Glass 5), Glass 4 and Glass 5, which were produced through heat treatment for 15 hours at 300° C. and acid treatment, have substantially the same UV transmittances as Glass 2 and Glass 3, which were produced without heat treatment for 15 hours at 300° C. and acid treatment. Further, EDTA had no effect on Glass 1.

Figure 4:
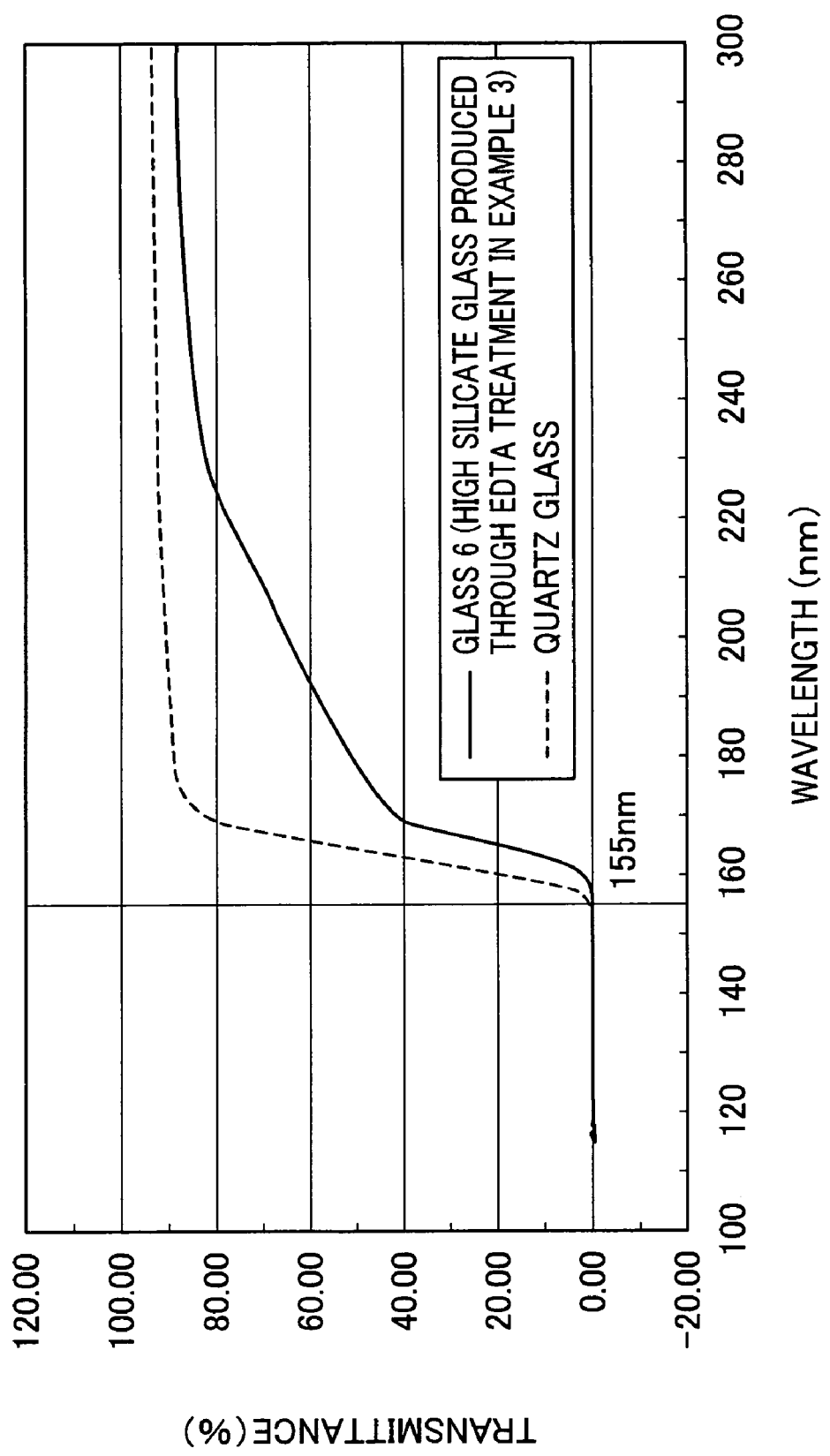
FIG. 4 is a graph showing a result of measuring a transmittance of Glass 6 with respect to light at a short wavelength of 300 nm to 115 nm. Note that Glass 6 is a type of high silicate glass which was produced in Example 3 and which was subjected to acid treatment with EDTA.

Further, a transmittance of Glass 6 with respect to light at a shorter wavelength of 300 nm to 115 nm was measured by using a vacuum UV spectrophotometer (Test Model PUV-100; manufactured by JASCO Corporation). The measurement result is shown in FIG. 4. For comparison, measurement was similarly conducted on a transmittance of quartz glass with respect to light at the short wavelength, the quartz glass being produced by a conventional method. In FIG. 4, the solid line indicates an absorption spectrum of Glass 6, and the dotted line indicates an absorption spectrum of the quartz glass.

As shown in FIG. 4, it was confirmed that Glass 6 exhibited a high UV transmittance, albeit slightly lower than the quartz glass, with respect to light at a short wavelength including the range from 300 nm to 115 nm.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

INDUSTRIAL APPLICABILITY

As described above, a method of the present invention for producing high silicate glass is characterized by including: a phase-separating step of subjecting to heat treatment borosilicate glass containing a heavy metal or rare-earth element, so as to phase-separate the borosilicate glass; an acid-treatment step of subjecting the phase-separated borosilicate glass to acid treatment so as to elute a metal; and a sintering step of sintering the acid-treated borosilicate glass.

The foregoing method for producing high silicate glass brings about an effect of obtaining high silicate glass which has a low Fe concentration and a high UV transmittance. Further, since the method applies the same method as the conventional Vycor method, high silicate glass which has a high UV transmission can be mass-produced at low cost.

High silicate glass of the present invention is produced by using the method of the present invention for producing high silicate glass.

Because the high silicate glass can be mass-produced at low cost compared with quartz glass which is produced by a melting process, a CVD process, or other processes, the high silicate glass can be upsized. Moreover, the high silicate glass has a higher UV transmittance than Vycor glass (glass produced by the conventional Vycor method) and has substantially the same UV transmittance as quartz glass. Therefore, the high silicate glass allows for formation of a complex compound by introducing UV emission photofunctional ions as dopants into the high silicate glass.

Further, the high silicate glass of the present invention contains silica as porous as that contained in the Vycor glass (glass produced by the conventional Vycor method). This means the high silicate glass has the advantage of being translucent and having a large surface area. The advantage allows the high silicate glass to be used as a photocatalyst carrier and a complex glass base material for a novel photofunctional material. Thus, the high silicate glass is expected to be used for various purposes.

Furthermore, high silicate glass of the present invention is characterized by transmitting 30% or more of light at a wavelength of 200 nm when containing 10 ppm or more of boron and having a thickness of 1 mm.

The high silicate glass exhibits a higher UV transmittance than the Vycor glass (glass produced by the conventional Vycor method). Therefore, the high silicate glass allows for formation of a complex compound by introducing UV emission photofunctional ions as dopants into the high silicate glass.

The high silicate glass of the present invention exhibits a high UV transmittance as described above. Therefore, the high silicate glass can be used as an excimer laser base material, a UV transmission filter, a UV utilization material, and the like.

The invention claimed is:

1. A method for producing high silicate glass, the method comprising:
    a phase-separating step of subjecting to heat treatment borosilicate glass containing any one element of manganese, cerium, chromium, cobalt, and copper, so as to phase-separate the borosilicate glass;
    an acid-treatment step of subjecting the phase-separated borosilicate glass to acid treatment so as to elute a metal; and
    a sintering step of sintering the acid-treated borosilicate glass,
    wherein the borosilicate glass includes 0.1 wt % to 2.0 wt % of an oxide of the one element of manganese, cerium, chromium, cobalt, and copper,
    wherein, when the borosilicate glass contains cerium or chromium, the borosilicate glass is subjected repeatedly to another heat treatment and another acid treatment between the acid-treatment step and the sintering step, and
    wherein a last acid treatment of the another acid treatment performed repeatedly is an acid treatment by using acid containing ethylenediamine tetraacetic acid.

2. The method according to claim 1, wherein the borosilicate glass is produced by carrying out first and second melting steps of melting a raw material by heating the raw material.

3. The method according to claim 2, wherein boric acid to be contained in the borosilicate glass is added in the second melting step.

* * * * *